United States Patent [19]

Yamamoto et al.

[11] Patent Number: 4,504,760
[45] Date of Patent: Mar. 12, 1985

[54] PIEZOELECTRICALLY DRIVEN VIBRATION WAVE MOTOR

[75] Inventors: Hiroshi Yamamoto, Yokohama; Makoto Katsuma, Kawasaki; Hiroyasu Murakami, Tokyo; Akira Hiramatsu, Yokohama, all of Japan

[73] Assignee: Canon Kabushiki Kaisha, Tokyo, Japan

[21] Appl. No.: 559,450

[22] Filed: Dec. 8, 1983

[30] Foreign Application Priority Data

Dec. 16, 1982 [JP] Japan ................. 57-220842

[51] Int. Cl.³ .............................. H01L 41/08
[52] U.S. Cl. ................. 310/323; 310/317; 310/328
[58] Field of Search ........... 310/317, 328, 321–323

[56] References Cited

U.S. PATENT DOCUMENTS 4,019,073  4/1977  Vishnevsky et al. ............ 310/8.2

Primary Examiner—Mark O. Budd
Attorney, Agent, or Firm—Fitzpatrick, Cella, Harper & Scinto

[57] ABSTRACT

A vibration wave motor comprises a movable member friction-contacted to a vibration member, a plurality of electrostrictive element groups oppositely arranged on the opposite surfaces of the vibration member, and voltage applying means for applying voltages to the electrostrictive element groups to generate travelling vibration waves in the vibration member. The electrostrictive elements are arranged such that the electrostrictive elements oppositely arranged on the opposite surfaces of the vibration member are strained in the opposite directions when the voltages are applied thereto.

4 Claims, 11 Drawing Figures

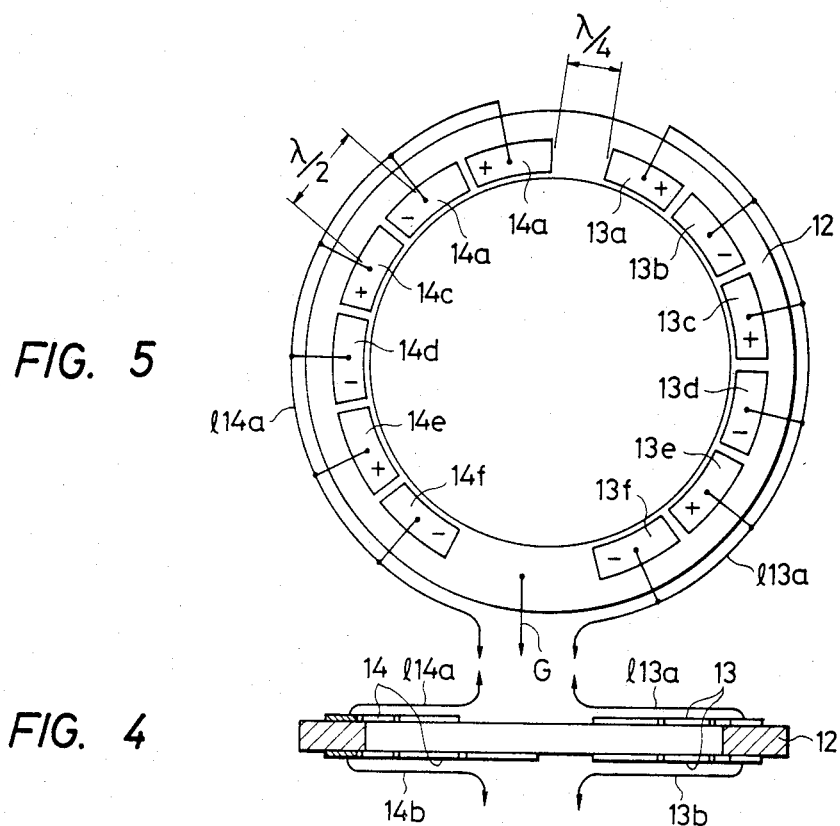
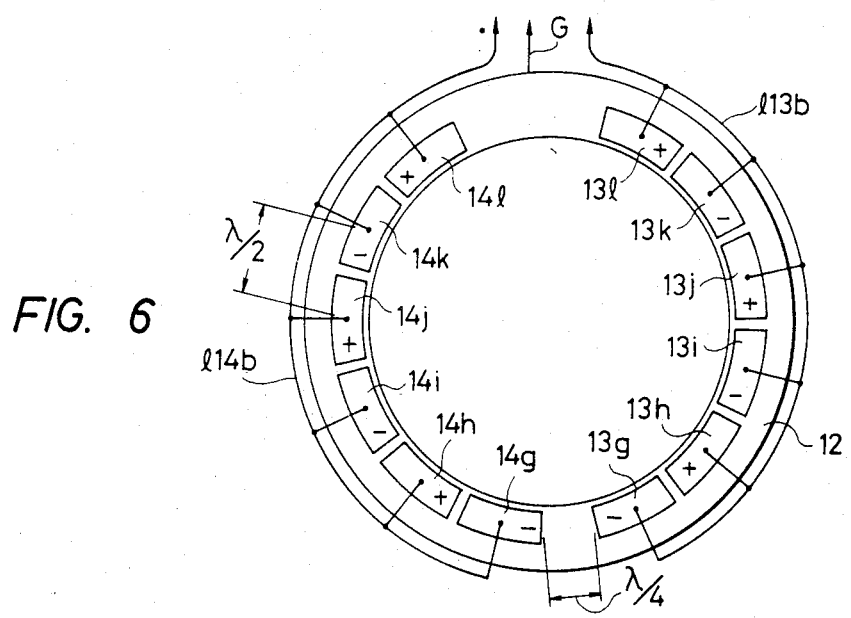

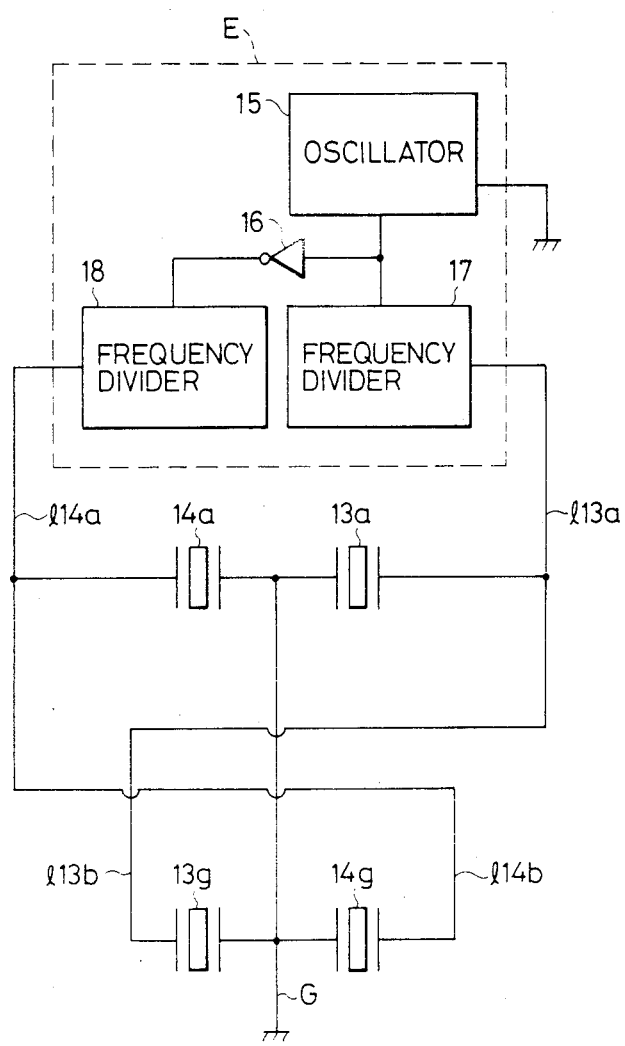

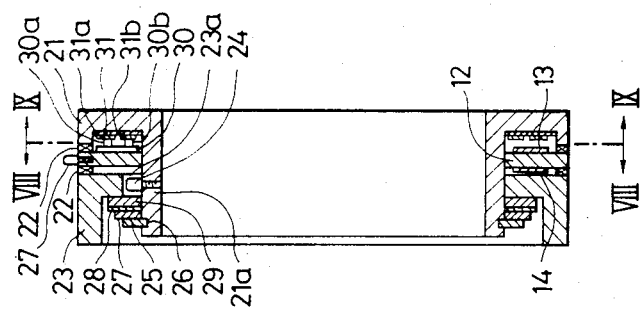
FIG. 8
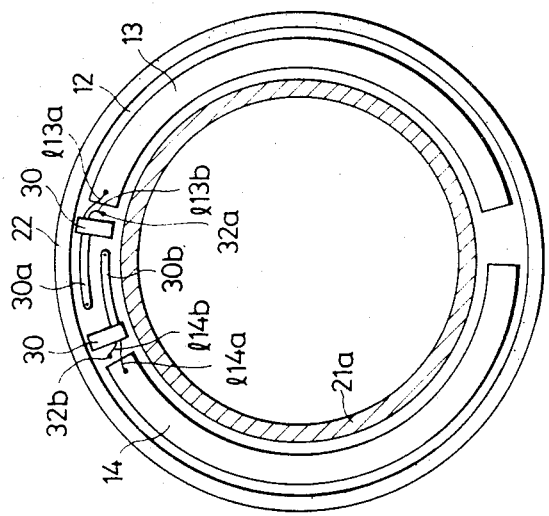
FIG. 9
FIG. 10

PIEZOELECTRICALLY DRIVEN VIBRATION WAVE MOTOR

BACKGROUND OF THE INVENTION

1. Field of the Invention

The present invention relates to a vibration wave motor driven by a travelling vibration wave.

2. Description of the Prior Art

As shown in the U.S. Pat. No. 4,019,073, a vibration wave motor transduces a vibration motion created in an electrostrictive element when a periodic voltage is applied thereto to a rotating or linear motion. Since it requires no winding unlike a conventional electric motor, it is simple in structure and compact, presents a high torque at a low rotating speed and has a low inertia moment.

However, in a known vibration wave motor, in transducing the vibration motion to the rotating motion, a movable member such as a rotor which contacts to a vibration motor is unidirectionaly friction-driven by a standing vibration wave generated in the vibration member. Therefore, the movable member friction-contacts to the vibration member in a forward motion of the vibration and is separated from the vibration member in a reverse motion of the vibration. As a result, the vibration member and the movable member must be in contact to each other within a small distance, that is, essentially in a point or line contact. Thus, a friction-drive efficiency is low.

Since a drive force acts in only a given direction, the movement of the movable member is unidirecitonal. In order to move the moveble member reversely, it is necessary to mechanically switch the direction of vibration by another vibration member. Thus, in order to provide a reversibly rotating vibration wave motor, a complex device is necessary. This redueces the advantages of the vibration wave motor, that is, the simple structure and the compactness.

In order to resolve the above problem, a vibration wave motor driven by a travelling vibration wave has recently been proposed.

FIG. 1 shows a developed view of such a vibration wave motor.

A vibration absorber 4, a metal ring vibration member 2 having an electrostrictive element 3 bonded thereon and a movable member 1 are inserted, in this order, to a central cylinder 5a of a stator 5 which serves as a base. The stator 5, the absorber 4 and the vibration member 2 are mounted such that they do not rotate with respect to each other. The movable member 1 is press-contacted to the vibration member 2 by a gravity or biasing means not shown to maintain integrity of the motor. A plurality of electrostrictive elements 3a are arranged at a pitch of one half of a wavelength λ of a vibration wave and a plurality of electrostrictive elements 3b are also arranged at a pitch of λ/2 on only one side of the vibration member 2. The electrostrictive elements 3a and 3b are phase-differentially arranged at a mutual pitch of $(n_o+\frac{1}{4})\lambda$ where $n_o=0, 1, 2, 3, ---$. Lead wires 11a are connected to the respective electrostrictive elements 3a and lead wires 11b are connected to the respective electrostrictive elements 3b, and the lead wires 11a and 11b are connected to an AC power supply 6a and a 90° phase shifter 6b, respectively (see FIG. 2). A lead wire 11c is connected to the metal vibration member 2 and it is also connected to the AC power supply 6a.

A friction area 1a of the movable member 1 is made of hard rubber to increase the friction force and reduce abrasion and it is press-contacted to the vibration member 2.

FIG. 2 illustrates the generation of the vibration wave in the motor. While the electrostrictive elements 3a and 3b bonded to the metal vibration member 2 are shown adjacent to each other for the sake of convenience of explanation, they meet the requirement of the λ/4 phase shift and are essentially equivalent to the arrangement of the electrostrictive elements 3a and 3b of the motor shown in FIG. 1. Symbols ⊕ in the electrostrictive elements 3a and 3b indicate that the electrostrictive elements expand in a positive cycle of the AC voltage, and symbols ⊖ indicate that they shrink in the positive cycle.

The metal vibration member 2 is used as one of the electrodes for the electrostrictive elements 3a and 3b, an AC voltage of $V=V_0\sin \omega t$ is applied to the electrostrictive elements 3a from the AC voltage supply 6a, and a voltage of $V=V_0\sin(\omega t \pm \pi/2)$ which is phase-shifted by λ/4 is applied to the electrostrictive elements 3b from the AC power supply 6a through the 90° phase shifter 6b. A sign "+" or "−" in the above equation is selected by the phase shifter 6b depending on the direction of movement of the movable member 1 (not shown in FIG. 2). When the sign "+" is selected, the phase is shifted by +90° and the movable member 1 is moved forwardly, and when the sign "−" is selected the phase is shifted by −90° and the movable member 1 is moved reversely. Let us assume that the sign "−" is selected and the voltage of $V=V_0\sin(\omega t-\pi/2)$ is applied to the electrostrictive elements 3b. When only the electrostrictive elements 3a are vibrated by the voltage of $V=V_0\sin \omega t$, a standing vibration wave shown in FIG. 2(a) is generated, and when only the electrostrictive elements 3b are vibrated by the voltage of $V=V_0\sin(\omega t-\pi/2)$, a standing vibration wave as shown in FIG. 2(b) is generated. When the two voltages having the phase difference between them are simultaneously applied to the electrostrictive elements 3a and 3b, the vibration wave travels. FIG. 2(c) shows a waveform at a time $t=2n\pi/\omega$, FIG. 2(d) shows a waveform at a time $t=\pi/2\omega+2n\pi/\omega$, FIG. 2(e) shows a waveform at a time $t=\pi/\omega+2n\pi/\omega$ and FIG. 2(f) shows a waveform at a time $t=3\pi/2\omega+2n\pi/\omega$. A waveform of the vibration wave travels in an x-direction.

Such a travelling vibration wave includes a longitudinal wave and a lateral wave, nothing a mass point A of the vibration member 2 shown in FIG. 3 it makes a clockwise rotating elliptic motion by a longitudinal amplitude u and lateral amplitude w. Since the movable member 1 is press-contacted to the surface of the vibration member 2 and it contacts to only an apex of the vibration plane, it is driven by a component of the longitudinal amplitude u of the elliptic motion of mass point A, A', . . . at the apexes so that the movable member 1 is moved in a direction of an arrow N.

When the phase is shifted by +90° by the 90° phase shifter, the vibration wave travels in a −x direction and the movable member 1 is moved oppositely to the direction N.

Thus, the vibration wave motor driven by the travelling vibration wave can switch the forward and reverse rotations with a very simple construction. A velocity of the mass point A at the apex is represented by $V=2\pi fu$ (where f is a vibration frequency) and a velocity of the movable member 1 depends on it and also depends on the lateral amplitude w because of the friction drive by the press-contact. Thus, the velocity of the movable member 1 is proportional to the magnitude of the elliptic motion of the mass point A and the magnitude of the elliptic motion is proportional to the voltage applied to the electrostrictive elements.

Accordingly, since the electrostrictive elements are arranged only on one side of the vibration member in the prior art vibration wave motor, a high drive efficiency cannot be attained.

SUMMARY OF THE INVENTION

It is an object of the present invention to provide a vibration wave motor having a high drive efficiency, in which electrostrictive elements are arranged on both sides of the vibration member.

Other object of the present invention will be apparent from the following description of the preferred embodiments of the present invention.

BRIEF DESCRIPTION OF THE DRAWINGS

FIG. 4 is a cross-sectional view of one embodiment of a vibration wave motor of the present invention, FIG. 5 is a plan view of a vibration member shown in FIG. 4, FIG. 6 is a bottom view of the vibration member shown in FIG. 4, FIG. 7 shows a drive circuit for the vibration wave motor of FIG. 4, FIG. 8 is a longitudinal sectional view of the vibration wave motor of FIG. 4, FIG. 9 is a cross-sectional view taken along a line VIII—VIII in FIG. 8, FIG. 10 is a cross-sectional view taken along a line IX—IX in FIG. 8.

DETAILED DESCRIPTION OF THE PREFERRED EMBODIMENTS

Figure 1:
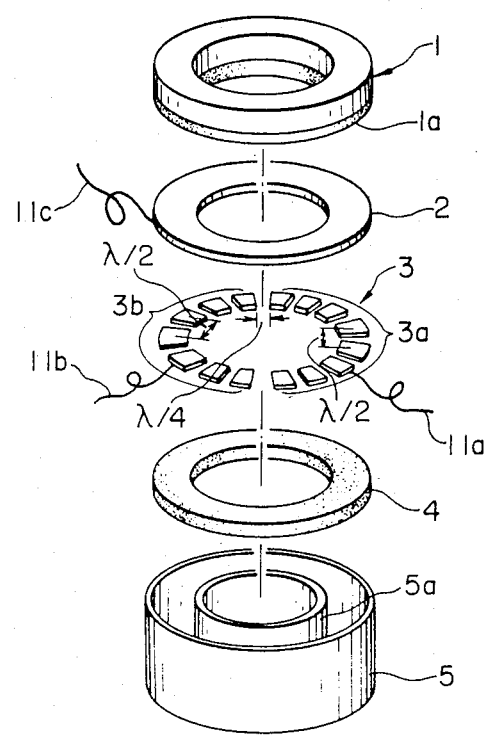
FIG. 1 is a developed view of a prior art vibration wave motor.

FIGS. 4 to 6 show vibration members of the vibration wave motor. As shown in FIG. 4, electrostrictive elements 13 and 14 are arranged on both sides of the vibration member 12.

FIG. 5 shows one side (upper side) of the vibration member 12, on which electrostrictive elements $13a$–$13f$ and $14a$–$14f$ are arranged. The electrostrictive elements $13a$ and $14a$ are phase-shifted from each other by $\frac{1}{4}$ wavelength. FIG. 6 shows a bottom view (lower side) of the vibration member 12, on which electrostirictive elements $13g$–$13l$ and $14g$–$14l$ are arranged to oppose to the electrostrictive elements $13a$–$13f$ and $14a$–$14f$. The electrostrictive elements $13g$ and $14g$ are phase-shifted from each other by $\frac{1}{4}$ wavelength.

The electrostrictive elements $13a$–$13f$, $14a$–$14f$, $13g$–$13l$ and $14g$–$14l$ on the respective sides of the vibration member 12 are arranged such that the electrostrictive elements which are strained oppositely by the application of the same voltage are arranged adjacently, for example, $13a$ and $13b$ and the electrostrictive elements which are strained oppositely by the application of the same voltage are arranged to oppose to each other through the vibration member 12, for example, $13a$ and $13g$. The electrostrictive elements $13a$–$13f$ $13g$–$13l$ are connected to lead wires and $113a$ and $113b$, respectively, and the electrostrictive elements $14a$–$14f$ and $14g$–$14l$ are connected to lead wires $114a$ and $114b$, respectively.

FIG. 7 shows a block diagram of a drive power supply E for applying voltages to the electrostrictive elements $13a$–$13l$ and $14a$–$14l$. It comprises an oscillator 15, an inverter 16 and frequency dividers 17 and 18. An output of the frequency divider 17 is applied to the electrostrictive elements $13a$–$13f$ and $13g$–$13l$ through the lead wires $113a$ and $113b$, respectively, and an output of the frequency divider 18 is applied to the electrostrictive elements $14a$–$14f$ and $14g$–$14l$ through the lead wires $114a$ and $114b$, respectively. In FIG. 7, only the wirings to the electrostrictive elements $13a$, $14a$, $13g$ and $14g$ are shown for the sake of simplification of the explanation. G denotes a ground line to ground the vibration member 12.

A pulse generated by the oscillator 15 is supplied to the frequency divider 17 and then to the frequency divider 18 through the inverter 16. The inverter 16 serves to shift the phases of the outputs of the frequency dividers 17 and 18 by 90° from each other. The electrostrictive elements $13g$ and $14g$ shrink when the voltage is applied thereto, and the electrostrictive elements $13a$ and $14a$ expand when the voltage is applied thereto. Since the electrostrictive elements $13a$ and $13g$ and the electrostrictive elements $14a$ and $14g$ are arranged oppositely on the opposite surfaces of the vibration member 12, the strains of those electrostrictive elements are added and a force to bend the vibration member 12 is multiplied. Since the electrostrictive elements $13a$ and $14a$ and the electrostrictive elements $13g$ and $14g$ are arranged with the 90° phase difference, a travelling vibration wave is generated by the application of the voltages having 90° phase difference, and the direction of movement of the moveble member, that is, the direction of drive of the vibration wave motor can be switched by advancing or retarding the phase by 90°.

FIG. 8 shows a sectional view of a vibration wave motor which uses the vibration member 12 of FIG. 4. Numeral 21 denotes a non-rotating motor body having a center cylindrical shaft $21a$ formed integrally. The ring-shaped vibration member 12 is rotatably fitted to the shaft $21a$. Numeral 22 denotes friction members arranged on both sides of the vibration member to hold a periphery of the ring-shaped vibration member 12. Numeral 23 denotes a press ring fitted to the shaft $21a$ to press the vibration member 12 to the motor body 21 through the friction members 22. A projection 24 formed on the shaft $21a$ engages with an axial recess $23a$ formed on the inner periphery of the press ring 23 to prevent the rotation thereof. Numeral 25 denotes a washer engaged with a circumferential groove 26 formed in an outer periphery of the shaft $21a$. It defines a position of a leaf spring 28 in a thrust direction through a low friction member 27. The leaf spring 28 urges the press ring 23 toward the vibration member 12 through a friction member 29.

FIG. 9 shows a sectional view taken along a line VIII—VIII in FIG. 8 to show a structure of the vibration member 12. The electrostrictive elements 13 and 14 (corresponding to the electrostrictive elements $13a$–$13f$ and 14a–14f shown in FIGS. 4–6) are arranged on the surface of the vibration member 12, and brushes 30a and 30b are fixed by mounts 30. The brushes 30a and 30b are connected to the electrostrictive elements 13 and 14 through the lead wires 113a, 113b, 114a and 114b. The lead wires 113b and 114b are connected to the electrostrictive elements 13 and 14 (corresponding to the electrostrictive elements 13g–13l and 14g–14l shown in FIGS. 4–6) on the back side of the vibration member through small holes 32a and 32b formed in the vibration member 12. Because the diameter of the small holes is very small, they do not substantially disturb the vibration wave generated in the vibration member 12. Since the vibration member 12 is grounded through the conductive motor body 21, the ground line G shown in FIGS. 5 and 6 is not necessary.

Figure 2:
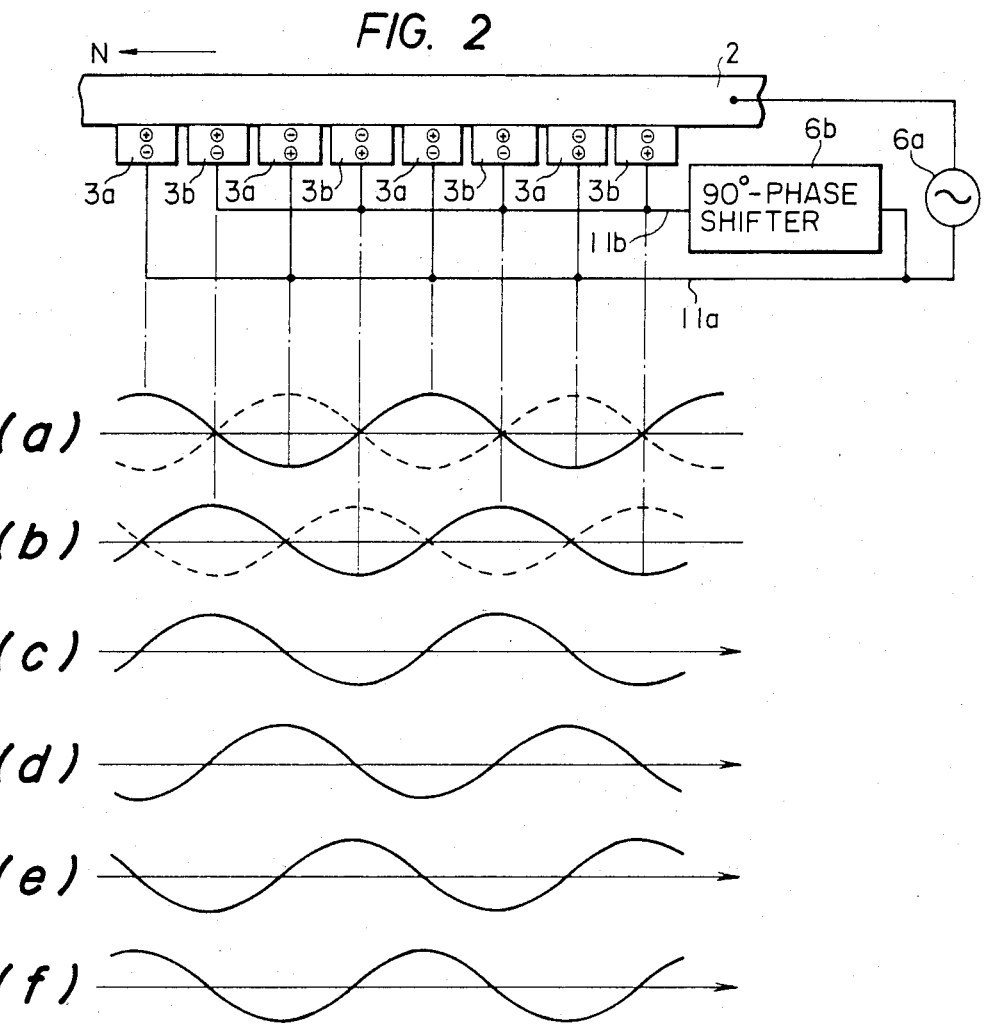
FIG. 2 illustrates the drive of the vibration wave motor.

FIG. 10 is a sectional view taken along a line IX—IX in FIG. 8. An electrode plate 31 formed by a glass-epoxy board or a flexible printed circuit board is arranged on the surface of the motor body 21, and electrode patterns 31a and 31b are arranged in a ring on the surface of the electrode plate to face the brushes 30a and 30b. Voltages are applied to the electrode patterns 31a and 31b from the drive power supply E (FIGS. 2 and 7) through the lead wires 33a and 33b.

Figure 3:
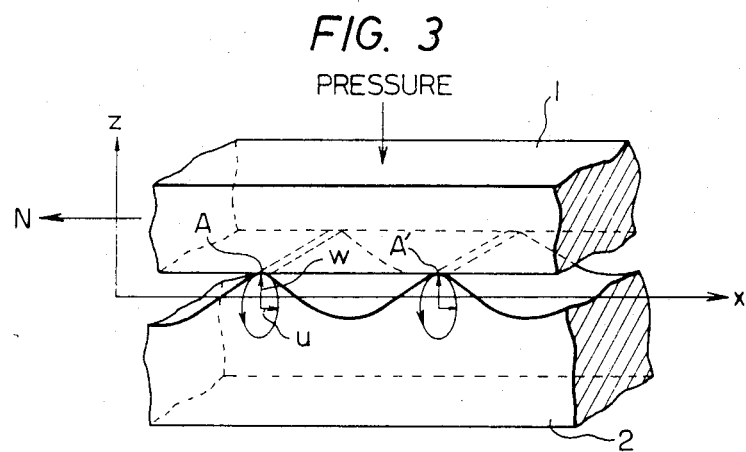
FIG. 3 illustrates a principle of the vibration wave motor.

When the voltages applied to the electrode patterns 31a and 31b are supplied to the electrostrictive elements 13 (13a–13f and 13g–13l) and 14 (14a–14f and 14g–14l) through the lead wires 113a, 113b, 114a and 114b, a circumferential travelling vibration wave (see FIGS. 2 and 3) is generated in the vibration member 12. Since the vibration member 12 is held by the friction members 22, it is rotated oppositely to the direction of travel of the travelling vibration wave by a reaction. When the vibration member 12 vibrates, the direction of travel of the travelling vibration wave on the front side of the vibration member 12 is the same as that on the back side. Accordingly, an amplitude of the vibration of the vibration member 12 is magnified and the travelling component of the travelling vibration wave is also magnified (theory of Railey wave). The vibration member 12 is rotated in one direction without loss although it is held by the friction members 22. The friction members 22 are press-contacted to the vibration member 12 by the leaf spring 28 so that the travelling vibration wave generated in the vibration member 12 is converted to a rotation energy of the vibration member without loss. Since the electrode patterns 31a and 31b to which the brushes 30a and 30b are contacted are of ring shape, the vibration member 12 is continuously rotated. The rotational torque of the vibration member 12 is transmitted to a driven-object (not shown) through an output shaft 27 projecting from the peripheral surface of the vibration member 12.

If contact areas between the brushes 30a and 30b and electrode patterns 31a and 31b vibrate, the power is not well supplied. In the illustrated embodiment, the electrode patterns 31a and 31b are arranged at the non-vibrating area, that is, on the surface of the motor body. Since the brushes 30a and 30b are elastic, the vibration is not transmitted to the ends of the the brushes even if they are fixed to the vibration member and the brush mounts 30 vibrate. Thus, a stable power feeding is attained.

In the illustrated embodiment, the electrostrictive elements which expand upon the application of the voltage and the electrostrictive element which shrink upon the application of the same voltage are alternately bonded to the vibration member 12. Alternatively, an electrostrictive element of a desired shape may be phase-differentially polarized to impart different properties (expansion and shrinkage) to respective areas. Further, a plurality of electrostrictive elements of the same property may be arranged and alternative ones of the electrostrictive elements may be grouped and voltages of opposite polarities may be applied to the respective groups to expand and shrink the respective groups.

In accordance with the present invention, the electrostrictive elements of different properties (expansion and shrinkage) are oppositely arranged on the opposite surfaces of the vibration member. Accordingly, the strains of the electrostrictive elements on the opposite sides are added to multiply the amplitude of vibration of the vibration member so that a large energy is generated with a small vibration member. Thus, a high output and high efficiency vibration wave motor with a simple construction is provided.

Figure 11:
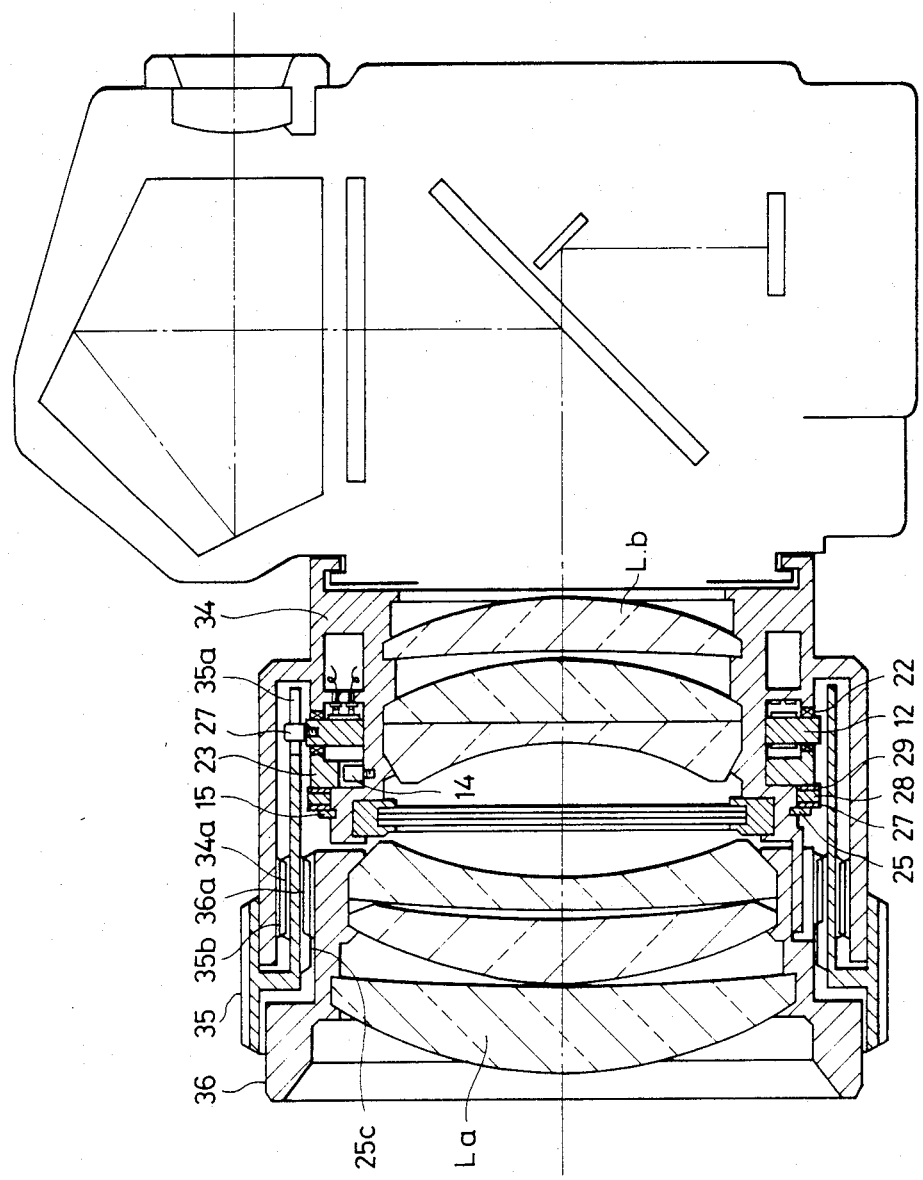
FIG. 11 is a longitudinal sectional view of a lens barrel having the vibration wave motor of FIG. 8 incorporated as a drive source.

FIG. 11 shows an application of the vibration wave motor of the present invention shown in FIGS. 8 to 10 to a lens barrel. A lens fixing member 34 is used as the motor body 21 in FIG. 8. The output shaft 27 of the motor engages with a slot 35a formed in a distance ring 35. As the output shaft 27 rotates with the vibration member 12, the distance ring 35 is rotated. A helicoid screw 34a formed on the lens fixing member 34 engages with a helicoid thread 35b formed in an outer periphery of the distance ring 35, and a helicoid screw 36a formed on a front lens ring 36 engages with a helicoid thread 35c formed in an inner periphery of the distance ring 35. Thus, the distance ring 35 and the front lens ring 36 are moved along an optical axis while they are rotated to chanage a distance between front lenses La and rear lenses Lb to focus an image.

What we claim is:

1. A vibration wave motor comprising:
   (a) a vibrating member;
   (b) a first pair of electro-strain element groups arranged or polarized phase-differentially on one surface of said vibrating member, each group including a plurality of electro-strain elements, wherein a first travelling vibration wave is generated in said vibrating member by application of voltages having a phase difference therebetween to said pair of electro-strain element groups;
   (c) a second pair of electro-strain element groups arranged or polarized phase-differentially on the other surface of said vibrating member, said second pair of electro-strain element groups being positioned oppositely to said first pair of electro-strain element groups, each of said second pair of electro-strain element groups including a plurality of electro-strain elements, wherein a second travelling vibration wave of the same direction as the first travelling vibration wave is generated in said vibrating member by application of a voltage having a phase difference therebetween to said second pair of electro-strain element groups and
   (d) a moving member press-contacted to said vibrating member to be friction-driven thereby.

2. A vibration wave motor according to claim 1, wherein said electro-strain elements oppositely arranged through said vibrating member on each surface of said vibrating member strain in reverse directions with respect to each other by the application of voltage to them.

3. A vibration wave motor according to claim 1, wherein said first pair of electro-strain element groups arranged on the one surface of said vibrating member consist of first and second groups, wherein said second pair of electro-strain element groups arranged on the other surface of said vibrating member consist of third and fourth groups, wherein said first and third groups and said second and fourth groups are respectively opposite through said vibrating member, wherein the voltage applied to said first group is the same as that applied to said third group and wherein the voltage applied to said second and fourth groups has a phase different from that applied to said first and second groups.

4. A vibration wave motor comprising:
(a) a vibrating member;
(b) first and second electro-strain element groups arranged on one surface of said vibrating member, each group generating a standing vibration wave by application of a voltage so that a first travelling vibration wave is generated in said vibrating member;
(c) third and fourth electro-strain element groups arranged on the other surface of said vibrating member, each group generating a standing vibration wave by application of a voltage so that a second travelling vibration wave of the same direction as said first travelling wave is generated in said vibrating member by said standing vibration wave; and
(d) a moving member press-contacted to said vibrating member to be friction-driven thereby.

* * * * *